United States Patent
Rana et al.

(10) Patent No.: US 12,446,018 B2
(45) Date of Patent: Oct. 14, 2025

(54) WiFi ROAM WITH BAND SWITCH AVOIDANCE

(71) Applicant: APPLE INC., Cupertino, CA (US)

(72) Inventors: Shehla S Rana, San Jose, CA (US); Rajneesh Kumar, Cupertino, CA (US); Yang Yu, Redwood, CA (US)

(73) Assignee: APPLE INC., Cupertino, CA (US)

( * ) Notice: Subject to any disclaimer, the term of this patent is extended or adjusted under 35 U.S.C. 154(b) by 299 days.

(21) Appl. No.: 18/296,193

(22) Filed: Apr. 5, 2023

(65) Prior Publication Data
US 2024/0340872 A1    Oct. 10, 2024

(51) Int. Cl.
*H04W 88/06* (2009.01)
*H04W 72/0453* (2023.01)

(52) U.S. Cl.
CPC ........ *H04W 72/0453* (2013.01); *H04W 88/06* (2013.01)

(58) Field of Classification Search
CPC ..... H04W 48/14; H04W 48/16; H04W 48/18; H04W 88/06
See application file for complete search history.

(56) References Cited

U.S. PATENT DOCUMENTS 11,310,295 B1* 4/2022 Demmer ............. H04L 65/4038

* cited by examiner

*Primary Examiner* — Sam Bhattacharya
(74) *Attorney, Agent, or Firm* — Dorsey & Whitney LLP (57) ABSTRACT

A wireless device may use a 5 GHz frequency band to support both Wi-Fi and Bluetooth. The 5 GHz frequency band may be divided into two portions (e.g., high sub-band and low sub-band). A Wi-Fi module of the wireless device may perform a roam scan on a first sub-band to determine attempt to find a candidate channel that meets a target criteria. When the candidate channel that meets the target criteria is found on the first sub-band, the Wi-Fi module may join the candidate channel. If no acceptable candidate channel is found, the wireless device may perform a band switch protocol to allow the Wi-Fi module to preform a roam scan on a second sub-band.

20 Claims, 6 Drawing Sheets

WiFi ROAM WITH BAND SWITCH AVOIDANCE

TECHNICAL FIELD

This application relates generally to wireless communication devices, including performing a Wi-Fi roam scan on a segmented frequency band.

BACKGROUND

Wireless communication technology uses various standards and protocols to transmit data between devices. Wireless communication system standards and protocols can include, for example, 3rd Generation Partnership Project (3GPP) Long Term Evolution (LTE) (e.g., 4G), 3GPP New Radio (NR) (e.g., 5G), Bluetooth® and Institute of Electrical and Electronics Engineers (IEEE) 802.11 standard for Wireless Local Area Networks (WLAN) (commonly known to industry groups as Wi-Fi®). The different protocols may use different frequency ranges to support wireless communications.

Wi-Fi® is a technology that uses radio waves to transmit data wirelessly between devices. It is most commonly used to connect devices to the Internet or to a local network, such as in a home or office. Wi-Fi® operates in the 2.4 GHz and 5 GHz frequency bands. Wi-Fi may be used for communicating between a wireless device and an access point.

Bluetooth®, on the other hand, is a short-range wireless communication technology that is used for connecting devices that are in close proximity to each other. Bluetooth® is often used to connect devices such as smartphones, headphones, and speakers, as well as for wireless input devices like keyboards and mice.

Some devices may support multiple wireless communication technologies. For instance, a device may support both Wi-Fi® and Bluetooth®.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Wireless technologies have become an integral part of life, from mobile phones to smart home devices. There is an increasing pressure to provide high quality audio to wireless devices. Typically, the frequency band used by Bluetooth is the 2.4 GHz. To increase the audio quality a wireless some wireless devices may use an expanded the frequency range for Bluetooth.

However, with the increasing demand for wireless connectivity, the available frequency bands are becoming more crowded. As a result, it is challenging to find a free frequency band for a new wireless technology without interfering with existing ones. Embodiments herein propose expanding the Bluetooth frequency range to operate in the 5 GHz frequency band. The 5 GHz frequency band is typically used for Wi-Fi. Accordingly, there may be interference between Wi-Fi and Bluetooth when operating simultaneously in 5 GHz frequency band.

There may be user equipment (UE) that requires Wi-Fi and Bluetooth to operate simultaneously in 5 GHz frequency band. Time division is one way in which a UE could operate Wi-Fi and Bluetooth on a same radio frequency channel. However, to maintain a high audio quality it may be important for Bluetooth to have access to all the time slots on a frequency channel. Accordingly, time division solution may not deliver performance requirements needed for certain use cases.

In some embodiments, frequency division may be used to support simultaneous operation of Wi-Fi and Bluetooth in the 5 GHz frequency band. In some embodiments, frequency division may be accomplished by dividing 5 GHz band into two non-overlapping sub-bands referred to herein as 5 GHz High and 5 GHz Low.

To coordinate frequency separated operations, a proprietary band switch protocol has been developed. The band switch protocol provides a coordination mechanism for Bluetooth and Wi-Fi to switch between operation in 5 GHz High and 5 GHz Low. The band switching poses challenges for legacy Wi-Fi operations like roam scans. During a roam scan, a UE will typically scan for available access points using multiple frequencies to detect a stronger signal than the current connection. However, the frequency division of the 5 GHz band poses a problem with how the UE can evaluate all the frequencies.

Accordingly, there is a need for a solution to make legacy Wi-Fi operations aware of the coexisting Bluetooth in the 5 GHz band and prevent disruptions to Wi-Fi that may be caused by frequent band switching. Embodiments herein provide apparatuses, systems, and methods to support Wi-Fi roam scans with simultaneous operation of Wi-Fi and Bluetooth in the 5 GHz frequency band.

Various embodiments are described with regard to a UE. However, reference to a UE is merely provided for illustrative purposes. The example embodiments may be utilized with any electronic component that may establish a wireless connection and is configured with the hardware, software, and/or firmware to wirelessly exchange information and data. Therefore, the UE as described herein is used to represent any appropriate electronic component.

Figure 1:
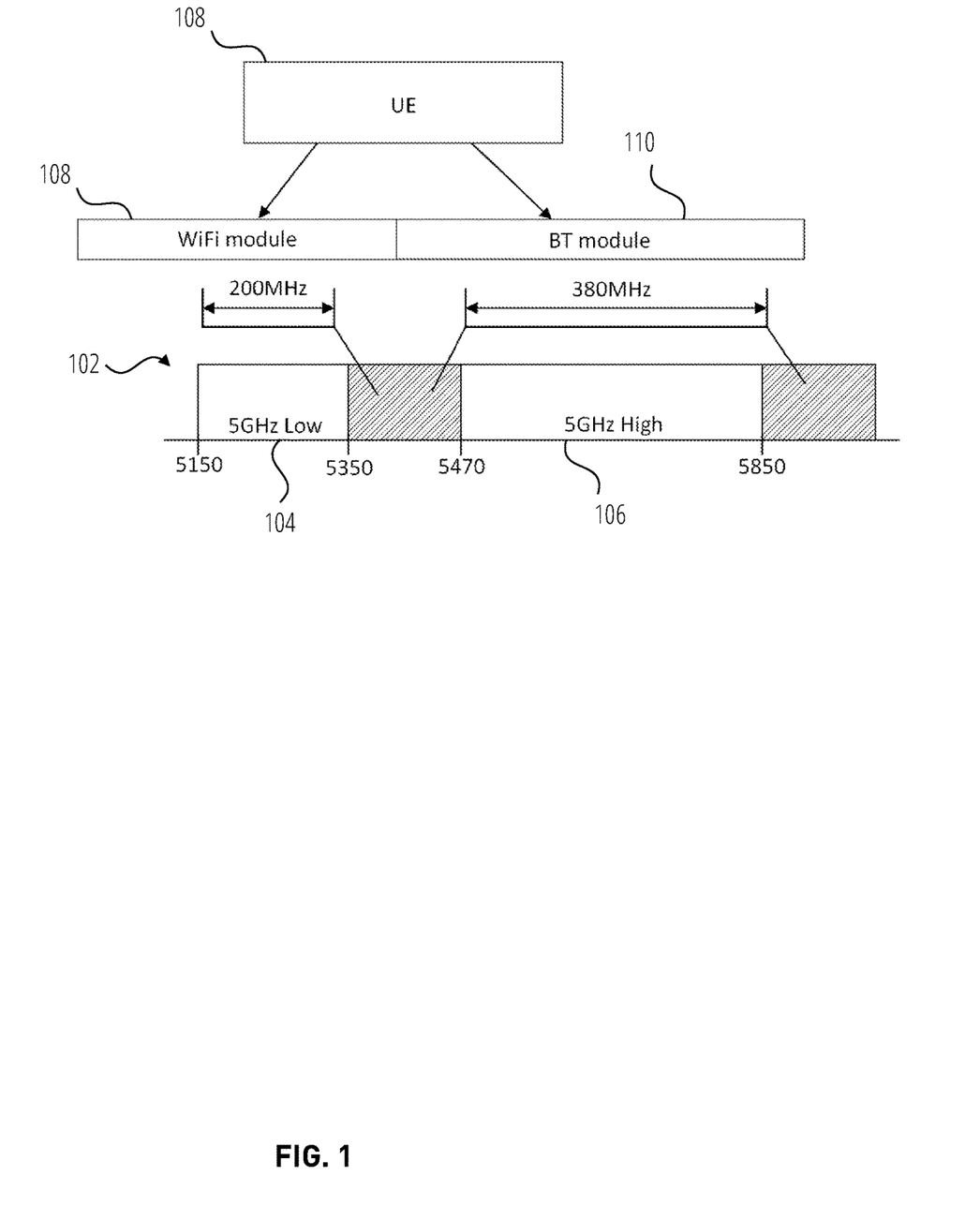
FIG. 1 illustrates the 5 Ghz frequency band subdivided into two non-overlapping sub-bands referred, in accordance with some embodiments.

FIG. 1 illustrates the 5 Ghz frequency band 102 subdivided into two non-overlapping sub-bands referred, in accordance with some embodiments. As shown, the 5 Ghz frequency band 102 may be divided into 5 GHz Low sub-band 104 and 5 GHz High sub-band 106. The 5 GHz Low sub-band 104 may range from 5150 MHz to 5350 MHz for a total range of 200 MHz. The 5 GHz High sub-band 106 may range from 5470 MHz to 5850 MHz for a total range of 380 MHz.

A Wi-Fi module 108 may include a Wi-Fi module 108 and a Bluetooth module 110. The Wi-Fi module 108 and the Bluetooth module 110 may both operate in the 5 Ghz frequency band 102. To prevent interference, the Wi-Fi module 108 may maintain band separation of the Wi-Fi module 108 and the Bluetooth module 110 by having one module utilize the 5 GHz Low sub-band 104 and the other module utilize 5 GHz High sub-band 106. For example, if the Wi-Fi module 108 is utilizing 5 GHz Low sub-band 104, then the Bluetooth module 110 is utilizing 5 GHZ High sub-band 106.

The Wi-Fi module 108 may coordinate the sub-bands between the Wi-Fi module 108 and the Bluetooth module 110 using a band switch protocol. The band switch protocol ensures non-overlapping operation between the Wi-Fi module 108 and the Bluetooth module 110 in the 5 GHz frequency band 102, while allowing the modules to move between the 5 GHZ Low sub-band 104 and the 5 GHZ High sub-band 106.

Figure 2:
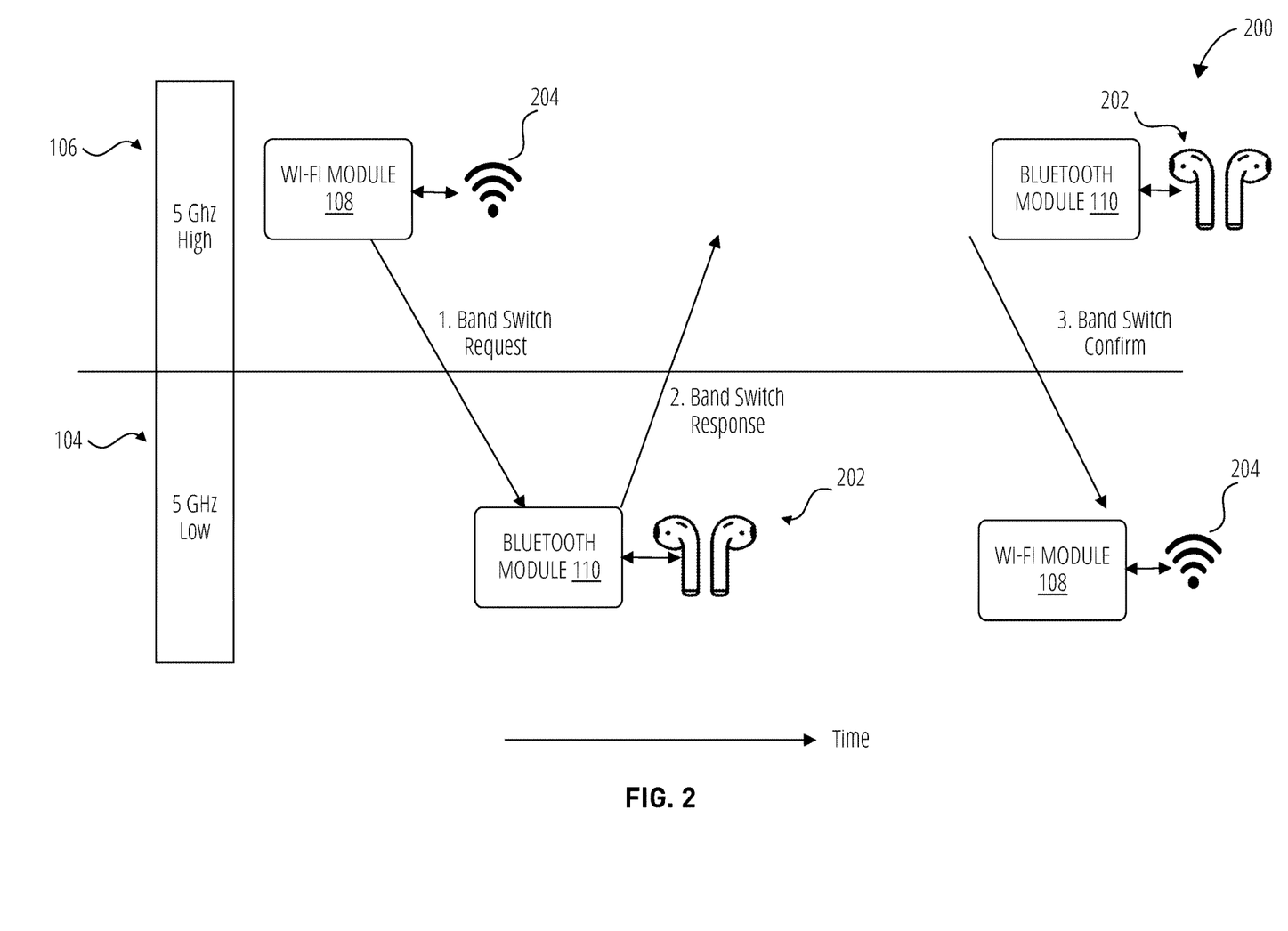
FIG. 2 illustrates a diagram of a band switch protocol, in accordance with some embodiments.

For example, FIG. 2 illustrates a diagram of a band switch protocol 200, in accordance with some embodiments. As shown, the band switch protocol 200 is a type of a request/response protocol where the two modules use a request/response mechanism to coordinate the sub-band occupation of Bluetooth and Wi-Fi on the 5 GHz frequency band.

In the illustrated band switch protocol 200, a UE includes a Wi-Fi module 108 and a Bluetooth module 110. At the beginning of the illustrated diagram, the Wi-Fi module 108 is in communication with a Wi-Fi access point 204 on 5 GHz High sub-band 106. The Bluetooth module 110 is in communication with a Bluetooth device 202 on 5 GHz Low sub-band 104. The Bluetooth device 202 may be an audio device such as wireless headphones.

At some point, the Wi-Fi module 108 may desire to switch from 5 GHZ High sub-band 106 to 5 GHz Low sub-band 104. To do so, the Wi-Fi module 108 sends a band switch request to the Bluetooth module 110. The band switch request may include a target switch time. The Wi-Fi module 108 continues operation on the current sub-band (e.g., 5 GHZ High sub-band 106) until the target switch time. The Bluetooth module 110 may coordinate with the Bluetooth device 202 to determine if the Bluetooth device 202 may be switched to the 5 GHZ High sub-band 106. The Bluetooth module 110 responds with band switch response. The band switch response indicates whether the Bluetooth module 110 accepts or rejects the band switch request. Once coordination is complete, the Bluetooth module 110 sends the Wi-Fi module 108 a band switch confirm, and the Wi-Fi module 108 and the Bluetooth module 110 switch their sub-bands of operation in 5 GHz frequency band. As shown, at the conclusion of the successful Band switch protocol 200, the Wi-Fi module 108 conducts communication with the Wi-Fi access point 204 on the 5 GHZ Low sub-band 104 and the Bluetooth module 110 conducts communication with the Bluetooth device 202 on the 5 GHZ High sub-band 106.

Essential Wi-Fi operations like roam scans can use the band switch protocol 200 to coordinate with Bluetooth. However, there are some risks associated with using the Band switch protocol 200 for Wi-Fi and Bluetooth coexistence on the 5 GHz frequency band. For example, a band switch request may be rejected or fail for various reasons. For example, a poor Bluetooth environment in the target band may cause the band switch request to be rejected. If the UE Bluetooth module 110 has a poor connection with the Bluetooth device 202, the Bluetooth module 110 may be unable to communicate adequately with the Bluetooth device 202 to perform the switch. Further ongoing critical operations in Bluetooth may prevent band switching. For example, the Bluetooth device 202 and Bluetooth module 110 may be already doing a coordination procedure, and it may be undesirable to force a new coordination procedure on a new sub-band.

Further, there is the potential for serious implications resulting from a band switch reject for the Wi-Fi module 108. For example, the Wi-Fi module 108 cannot transmit in a sub-band if the Bluetooth module 110 is using the 5 GHz sub-band and hence remains transmit muted until a successful band switch happens. If the transmit muted lasts for too long, the Wi-Fi module 108 may become disassociated with its Wi-Fi access point 204 and lose connectivity altogether. Embodiments herein include methods to maintain Wi-Fi functionality such as roam scans while minimizing the risks from the band switch protocol 200.

Figure 3:
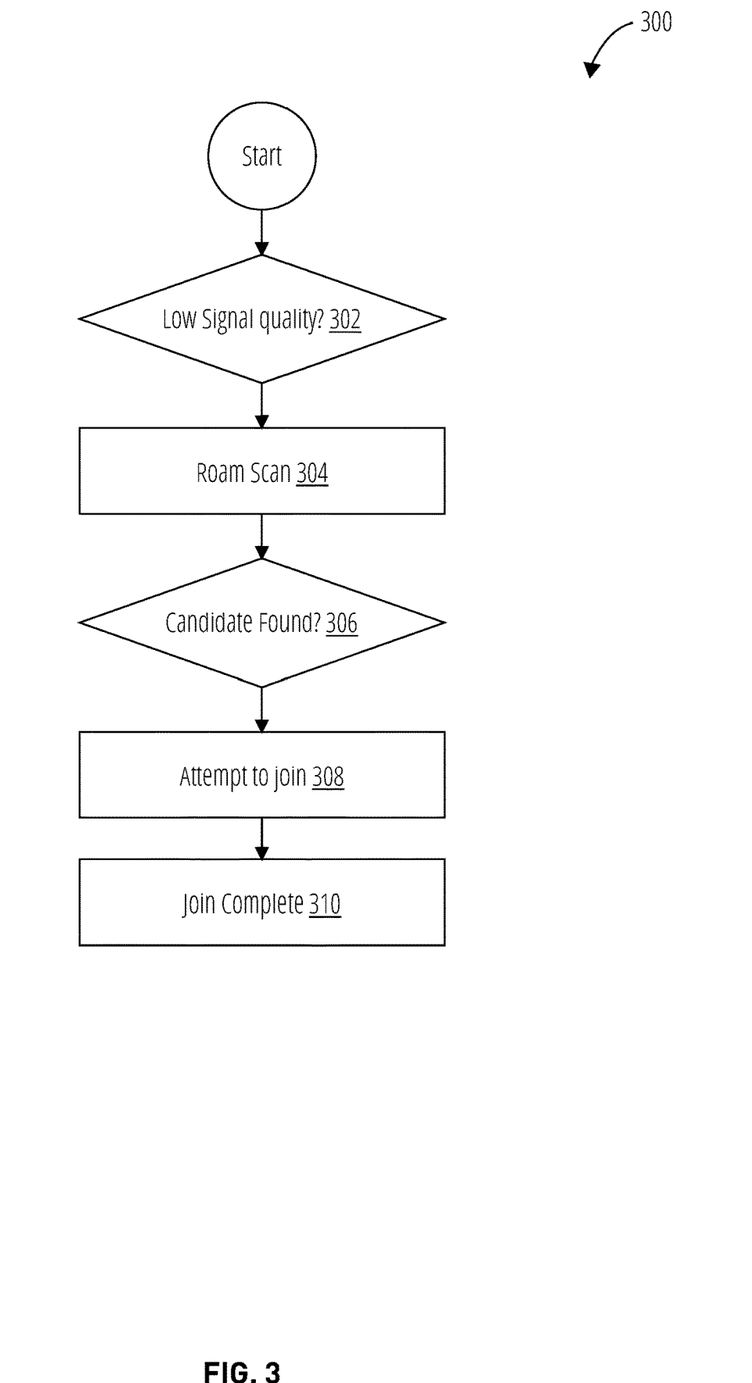
FIG. 3 illustrates a flow chart of a method for a basic Wi-Fi roam scan, in accordance with some embodiments.

FIG. 3 illustrates a flow chart of a method 300 for a basic Wi-Fi roam scan, in accordance with some embodiments. The method 300 may be used when the 5 GHZ frequency band is not subdivided and a Wi-Fi module has access to all the channels. The method 300 may be performed by a Wi-Fi module of a UE. The method 300 includes determining 302 low signal quality on a current access point.

The Wi-Fi module may perform 304 a roam scan if there is low signal quality. During the roam scan, the Wi-Fi module may tune to different frequencies in the 5 GHZ band to search for nearby access points, looking for a better signal. When an acceptable candidate channel is found 306, the Wi-Fi module attempts 308 to join the access point with a better signal and completes 310 joining with the new access point.

However, when the 5 GHz band is subdivided, the Wi-Fi module may only have access to scan the portion of the frequency band that the Bluetooth module is not occupying. Accordingly, the band switch protocol may be used by the Wi-Fi module to scan the whole 5 Ghz frequency band.

Figure 4:
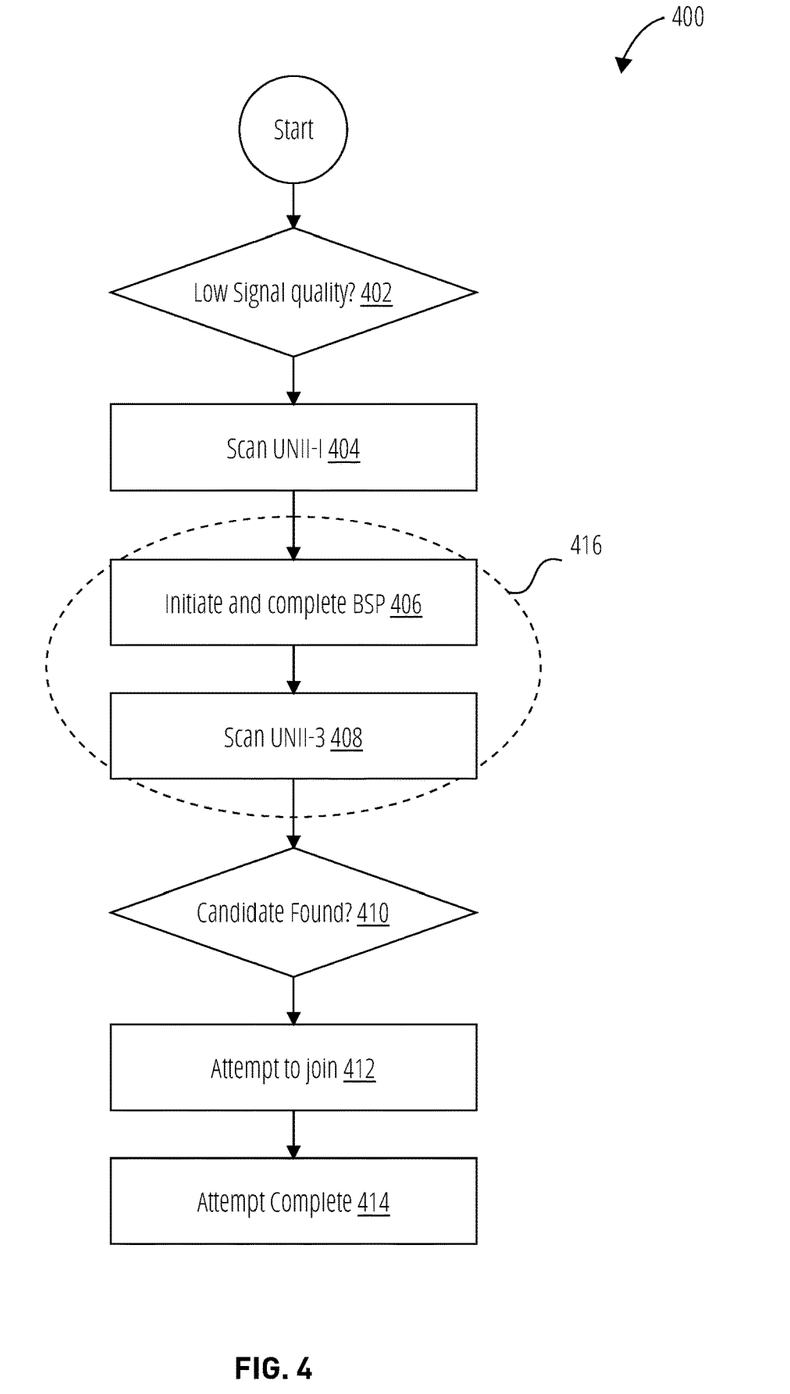
FIG. 4 illustrates a flowchart of a method for a Wi-Fi roam scan with band switching, in accordance with some embodiments

FIG. 4 illustrates a flowchart of a method 400 for a Wi-Fi roam scan with band switching 416, in accordance with some embodiments. The method 400 includes determining 402 low signal quality on a current access point. The Wi-Fi module may perform 404 a roam scan on a sub-band of the 5 GHz frequency that the Wi-Fi module is currently occupying. For example, if the Wi-Fi module is assigned to the 5 GHz Low sub-band, the Wi-Fi module may do a roam scan on the UNII-1 band.

In the illustrated method 400, the Wi-Fi module initiates and completes 406 the band switch protocol with the Bluetooth module. Accordingly, the Wi-Fi module may shift from 5 GHz Low sub-band to the 5 GHz High sub-band. Similarly, if the Wi-Fi module previously occupied the 5 GHz High sub-band, the band switch protocol may be used to shift the Wi-Fi module to the 5 GHz Low sub-band.

After the band switch, the Wi-Fi module may scan 408 the other sub-band of the 5 GHz frequency. For example, if the Wi-Fi module has switched to the 5 GHz High sub-band, the Wi-Fi module may do a roam scan on the UNII-3 band.

The Wi-Fi module may evaluate the results of the roam scan of the low sub-band and the high sub-band to determine 410 if an acceptable candidate was found. If an acceptable candidate was found, the Wi-Fi module attempts 412 to join the access point with a better signal and completes 414 joining with the new access point.

However, performing a band switch protocol every time the Wi-Fi module performs a roam scan may result in an inefficient use of resources. Performing a band switch protocol for every roam scan would result in request/response sequences with the Bluetooth module. Additionally, the Bluetooth module would need to coordinate with the external Bluetooth device (e.g., headphones) for each band switch. The band switch requests may be rejected or fail as previously discussed which may result in Wi-Fi transmission being muted and potentially becoming disassociated with an access point. Additionally, there is no guarantee that the opposite side of the 5 Ghz frequency band has a better candidate.

Figure 5:
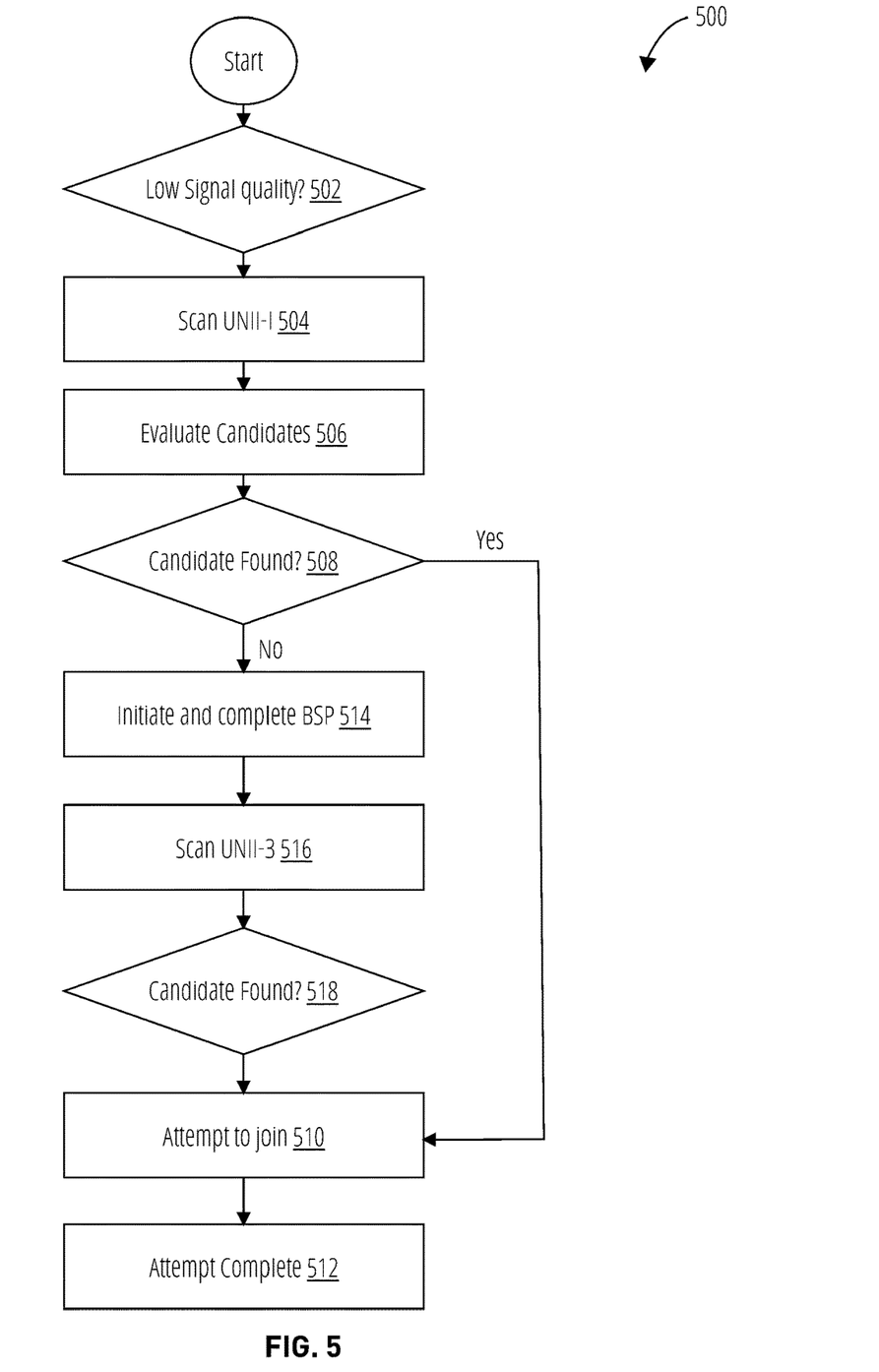
FIG. 5 illustrates a flow chart of a method for a Wi-Fi roam scan with band switch avoidance, in accordance with some embodiments.

FIG. 5 illustrates a flow chart of a method 500 for a Wi-Fi roam scan with band switch avoidance, in accordance with some embodiments. A Wi-Fi module employing the illustrated method 300 may reduce the number of band switches that occur by attempting to find a candidate in a current sub-band that meets a target criteria before executing a band switch. The first transceiver (e.g., Wi-Fi module) may occupy a first sub-band of the 5 GHz frequency band, and a second transceiver (e.g., Bluetooth module) may occupy a second sub-band of the 5 GHz frequency band.

As shown, the method 500 includes determining 502 low signal quality on a current access point. The Wi-Fi module may perform 504 a roam scan on a sub-band of the 5 GHz frequency that the Wi-Fi module is currently occupying. For example, if the Wi-Fi module is assigned to the 5 GHz Low sub-band, the Wi-Fi module may do a roam scan on the UNII-1 band. The Wi-Fi module may evaluate 506 candidates found on the current sub-band and determine 508 if at least one of the candidates on the current sub-band meets a connection criteria. If an acceptable candidate is found, the Wi-Fi module attempts 510 to join the access point with the better signal quality on the current sub-band, and completes 512 joining with the new access point without band switching or scanning the other sub-band.

In other words, the Wi-Fi module may determine a local optimum candidate (e.g., the best candidate in a current sub-band), and if the local optimum candidate meets the target criteria the Wi-Fi module does not scan the other sub-band to find a global optimum candidate. A global optimum candidate refers to the best access point across the entire 5 Ghz frequency band according to the target criteria, whereas a local optimum candidate refers to the best access point across a sub-band (e.g., 5 GHZ High sub-band or 5 GHz Low sub-band) according to the target criteria. The criteria may include a signal strength threshold, security requirements, bandwidth and speed requirements, connection stability requirements, and/or user preferences. If a candidate a local optimum candidate is found, the Wi-Fi module does not band switch and connects to the local optimum candidate.

In the illustrated method 500, the Wi-Fi module initiates and completes 514 the band switch protocol with the Bluetooth module to move to a second sub-band if there is no candidate found in the first sub-band that meets the target criteria. Accordingly, the Wi-Fi module may shift from 5 GHz Low sub-band to the 5 GHz High sub-band. Similarly, if the Wi-Fi module previously occupied the 5 GHZ High sub-band, the band switch protocol may be used to shift the Wi-Fi module to the 5 GHZ Low sub-band.

After the band switch, the Wi-Fi module may scan 516 the other sub-band of the 5 GHz frequency. For example, if the Wi-Fi module has switched to the 5 GHZ High sub-band, the Wi-Fi module may do a roam scan on the UNII-3 band. The Wi-Fi module may evaluate the results of the roam scan of the low sub-band and the high sub-band to determine 518 if an acceptable candidate was found. If an acceptable candidate was found, the Wi-Fi module attempts 510 to join the access point with a better signal and completes 512 joining with the new access point.

Introducing band switch avoidance may provide several benefits. For example, the method 500 may reduce the time to complete roam scan by preempting band switches unless necessary. Avoiding band switching when possible may reduce the risk of losing Wi-Fi connectivity and transmit muting. Further, in the method 500 the same roam criteria may be used. Thus, the roam criteria may maintain the same minimum bar for candidate selection so the quality of new join candidate is not compromised. Additionally, band switch avoidance may benefit the Bluetooth audio operation indirectly.

Embodiments contemplated herein include an apparatus comprising means to perform one or more elements of the method 500. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 500. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE (such as a wireless device 602 that is a UE, as described herein).

Embodiments contemplated herein include a signal as described in or related to one or more elements of the method 500.

Embodiments contemplated herein include a computer program or computer program product comprising instructions, wherein execution of the program by a processor is to cause the processor to carry out one or more elements of the method 500. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Figure 6:
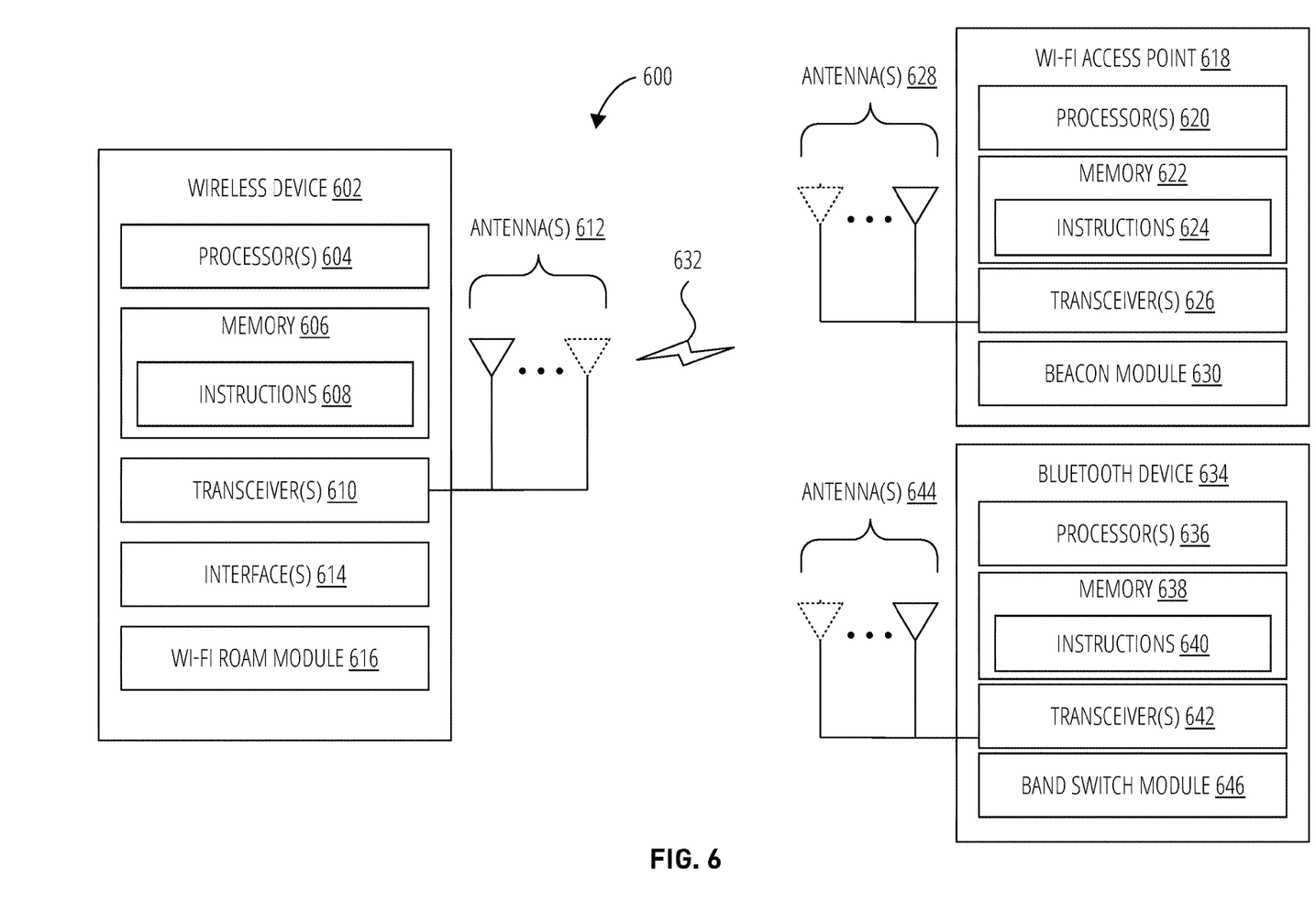
FIG. 6 illustrates a system for performing signaling between a wireless device and a network device, according to embodiments disclosed herein.

FIG. 6 illustrates a system 600 for performing signaling 632 between a wireless device 602, a Wi-Fi access point 618, and a Bluetooth device 634, according to embodiments disclosed herein. The wireless device 602 may be, for example, a UE as described herein.

The wireless device 602 may include one or more processor(s) 604. The processor(s) 604 may execute instructions such that various operations of the wireless device 602 are performed, as described herein. The processor(s) 604 may include one or more processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter circuitry and/or receiver circuitry that use the antenna(s) 612 of the wireless device 602 to facilitate signaling (e.g., the signaling 632) to and/or from the wireless device 602 with other devices (e.g., the Wi-Fi access point 618 and Bluetooth device 634).

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a Wi-Fi roam module 616. The Wi-Fi roam module 616 may be implemented via hardware, software, or combinations thereof. For example, the Wi-Fi roam module 616 may be implemented as a processor, circuit, and/or instructions 608 stored in the memory 606 and executed by the processor(s) 604. In some examples, the Wi-Fi roam module 616 may be integrated within the processor(s) 604 and/or the transceiver(s) 610. For example, the Wi-Fi roam module 616 may be implemented by a combination of software components (e.g., executed by a DSP or a general processor) and hardware components (e.g., logic gates and circuitry) within the processor(s) 604 or the transceiver(s) 610.

The Wi-Fi roam module 616 may be used for various aspects of the present disclosure, for example, aspects of FIG. 5. The Wi-Fi roam module 616 is configured to execute a Wi-Fi roam scan while Wi-Fi and Bluetooth are both in sub-bands of the 5 GHZ frequency band.

The Wi-Fi access point 618 may include one or more processor(s) 620. The processor(s) 620 may execute instructions such that various operations of the Wi-Fi access point 618 are performed, as described herein. The processor(s) 620 may include one or more baseband processors implemented using, for example, a CPU, a DSP, an ASIC, a controller, an FPGA device, another hardware device, a firmware device, or any combination thereof configured to perform the operations described herein.

The Wi-Fi access point 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The Wi-Fi access point 618 may include one or more transceiver(s) 626 that may include transmitter circuitry and/or receiver circuitry that use the antenna(s) 628 of the Wi-Fi access point 618 to facilitate signaling (e.g., the signaling 632) to and/or from the Wi-Fi access point 618 with other devices (e.g., the wireless device 602).

The Wi-Fi access point 618 may include one or more antenna(s) 628 (e.g., one, two, four, or more). In embodiments having multiple antenna(s) 628, the Wi-Fi access point 618 may perform MIMO, digital beamforming, analog beamforming, beam steering, etc., as has been described.

The Wi-Fi access point 618 may include a beacon module 630. The beacon module 630 may be implemented via hardware, software, or combinations thereof. For example, the beacon module 630 may be implemented as a processor, circuit, and/or instructions 624 stored in the memory 622 and executed by the processor(s) 620. In some examples, the beacon module 630 may be integrated within the processor(s) 620 and/or the transceiver(s) 626. For example, the beacon module 630 may be implemented by a combination of software components (e.g., executed by a DSP or a general processor) and hardware components (e.g., logic gates and circuitry) within the processor(s) 620 or the transceiver(s) 626.

The beacon module 630 may be used for various aspects of the present disclosure. The beacon module 630 is configured to transmit a beacon signal that the wireless device 602 may use when determining an access point to join.

The Bluetooth device 634 may include one or more processor(s) 636. The processor(s) 636 may execute instructions such that various operations of the Bluetooth device 634 are performed, as described herein. The processor(s) 620 may include one or more baseband processors implemented using, for example, a CPU, a DSP, an ASIC, a controller, an FPGA device, another hardware device, a firmware device, or any combination thereof configured to perform the operations described herein.

The Bluetooth device 634 may include a memory 638. The memory 638 may be a non-transitory computer-readable storage medium that stores instructions 640 (which may include, for example, the instructions being executed by the processor(s) 636). The instructions 640 may also be referred to as program code or a computer program. The memory 638 may also store data used by, and results computed by, the processor(s) 636.

The Bluetooth device 634 may include one or more transceiver(s) 642 that may include transmitter circuitry and/or receiver circuitry that use the antenna(s) 644 of the Bluetooth device 634 to facilitate signaling (e.g., the signaling 632) to and/or from the Bluetooth device 634 with other devices (e.g., the wireless device 602).

The Bluetooth device 634 may include one or more antenna(s) 644 (e.g., one, two, four, or more). In embodiments having multiple antenna(s) 644, the Bluetooth device 634 may perform MIMO, digital beamforming, analog beamforming, beam steering, etc., as has been described.

The Bluetooth device 634 may include a band switch module 646. The band switch module 646 may be implemented via hardware, software, or combinations thereof. For example, the band switch module 646 may be implemented as a processor, circuit, and/or instructions 640 stored in the memory 638 and executed by the processor(s) 636. In some examples, the band switch module 646 may be integrated within the processor(s) 636 and/or the transceiver(s) 642. For example, the band switch module 646 may be implemented by a combination of software components (e.g., executed by a DSP or a general processor) and hardware components (e.g., logic gates and circuitry) within the processor(s) 636 or the transceiver(s) 642.

The band switch module 646 may be used for various aspects of the present disclosure. The band switch module 646 is configured to switch the frequency of operation of the Bluetooth device 634 when requested by the wireless device 602.

For one or more embodiments, at least one of the components set forth in one or more of the preceding figures may be configured to perform one or more operations, techniques, processes, and/or methods as set forth herein. For example, a processor as described herein in connection with one or more of the preceding figures may be configured to operate in accordance with one or more of the examples set forth herein. For another example, circuitry associated with a UE as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless device with a first transceiver and a second transceiver, the method comprising:
    connecting the first transceiver to a first device via a first sub-band of a frequency band, and connecting the second transceiver to a second device via a second sub-band of the frequency band;
    determining low signal quality for the first transceiver on a current channel of the first sub-band;
    scanning, via the first transceiver, the first sub-band for a candidate channel that meets a target criteria;
    when the candidate channel that meets the target criteria is found on the first sub-band, joining, via the first transceiver, the candidate channel; and
    when the candidate channel that meets the target criteria is not found on the first sub-band:
        performing a band switch protocol to cause the first transceiver and the second transceiver to switch sub-bands;
        scanning, via the first transceiver, the second sub-band for the candidate channel that meets the target criteria on the second sub-band; and
        joining, via the first transceiver, the candidate channel that meets the target criteria on the second sub-band.

2. The method of claim 1, wherein performing the band switch protocol comprises:
    sending a band switch request from the first transceiver to the second transceiver;
    coordinating, via the second transceiver, with the second device to determine if the second device may be switched to the first sub-band; and
    sending a band switch response from the second transceiver to the first transceiver.

3. The method of claim 1, wherein the band switch protocol is not performed when the candidate channel that meets the target criteria is found on the first sub-band.

4. The method of claim 1, wherein the first transceiver is a Wi-Fi transceiver and the second transceiver is a Bluetooth transceiver.

5. The method of claim 1, wherein the frequency band is a 5 GHz band.

6. The method of claim 5, wherein the frequency band is divided into a low sub-band and a high sub-band, wherein the low sub-band ranges from 5150 MHz to 5350 MHz, and the high sub-band ranges from 5470 MHz to 5850 MHz.

7. The method of claim 1, wherein the target criteria comprises a signal strength threshold.

8. A wireless device comprising:
   a first transceiver,
   a second transceiver,
   a processor; and
   a memory storing instructions that, when executed by the processor, configure the wireless device to:
   connect the first transceiver to a first device via a first sub-band of a frequency band, and connect the second transceiver to a second device via a second sub-band of the frequency band;
   determine low signal quality for the first transceiver on a current channel of the first sub-band;
   scan, via the first transceiver, the first sub-band for a candidate channel that meets a target criteria;
   when the candidate channel that meets the target criteria is found on the first sub-band, join, via the first transceiver, the candidate channel; and
   when the candidate channel that meets the target criteria is not found on the first sub-band:
      perform a band switch protocol to cause the first transceiver and the second transceiver to switch sub-bands;
      scan, via the first transceiver, the second sub-band for the candidate channel that meets the target criteria on the second sub-band; and
      join, via the first transceiver, the candidate channel that meets the target criteria on the second sub-band.

9. The wireless device of claim 8, wherein performing the band switch protocol comprises:
   sending a band switch request from the first transceiver to the second transceiver;
   coordinating, via the second transceiver, with the second device to determine if the second device may be switched to the first sub-band; and
   sending a band switch response from the second transceiver to the first transceiver.

10. The wireless device of claim 8, wherein the band switch protocol is not performed when the candidate channel that meets the target criteria is found on the first sub-band.

11. The computing apparatus of claim 8, wherein the first transceiver is a Wi-Fi transceiver and the second transceiver is a Bluetooth transceiver.

12. The computing apparatus of claim 8, wherein the frequency band is a 5 GHz band.

13. The computing apparatus of claim 12, wherein the frequency band is divided into a low sub-band and a high sub-band, wherein the low sub-band ranges from 5150 MHz to 5350 MHz, and the high sub-band ranges from 5470 MHz to 5850 MHz.

14. The computing apparatus of claim 8, wherein the target criteria comprises a signal strength threshold.

15. A non-transitory computer-readable storage medium, the computer-readable storage medium including instructions that when executed by a computer, cause the computer to:
   connect a first transceiver to a first device via a first sub-band of a frequency band, and connecting a second transceiver to a second device via a second sub-band of the frequency band;
   determine low signal quality for the first transceiver on a current channel of the first sub-band;
   scan, via the first transceiver, the first sub-band for a candidate channel that meets a target criteria;
   when the candidate channel that meets the target criteria is found on the first sub-band, join, via the first transceiver, the candidate channel; and
   when the candidate channel that meets the target criteria is not found on the first sub-band:
   perform a band switch protocol to cause the first transceiver and the second transceiver to switch sub-bands;
   scan, via the first transceiver, the second sub-band for the candidate channel that meets the target criteria on the second sub-band; and
   join, via the first transceiver, the candidate channel that meets the target criteria on the second sub-band.

16. The computer-readable storage medium of claim 15, wherein performing the band switch protocol comprises:
   sending a band switch request from the first transceiver to the second transceiver;
   coordinating, via the second transceiver, with the second device to determine if the second device may be switched to the first sub-band; and
   sending a band switch response from the second transceiver to the first transceiver.

17. The computer-readable storage medium of claim 15, wherein the band switch protocol is not performed when the candidate channel that meets the target criteria is found on the first sub-band.

18. The computer-readable storage medium of claim 15, wherein the first transceiver is a Wi-Fi transceiver and the second transceiver is a Bluetooth transceiver.

19. The computer-readable storage medium of claim 15, wherein the frequency band is a 5 GHz band.

20. The computer-readable storage medium of claim 19, wherein the frequency band is divided into a low sub-band and a high sub-band, wherein the low sub-band ranges from 5150 MHz to 5350 MHz, and the high sub-band ranges from 5470 MHz to 5850 MHz.

* * * * *